United States Patent [19]
Auerbach et al.

[11] Patent Number: 4,652,594
[45] Date of Patent: Mar. 24, 1987

[54] GLASS FIBER-REINFORCED OXYMETHYLENE POLYMER MOLDING COMPOSITIONS HAVING MECHANICAL PROPERTIES ENHANCED BY AMINO-FORMALDEHYDE RESIN COUPLING AGENTS

[75] Inventors: Andrew B. Auerbach, Livingston, N.J.; Derrick B. McKie, Brooklyn, N.Y.

[73] Assignee: Celanese Corporation, New York, N.Y.

[21] Appl. No.: 787,952

[22] Filed: Oct. 16, 1985

[51] Int. Cl.$^4$ .................................................. C08K 7/14
[52] U.S. Cl. .................................... 523/208; 523/209; 523/466; 524/542; 524/593
[58] Field of Search ................ 523/466, 208; 524/100, 524/195, 542, 593

[56] References Cited

U.S. PATENT DOCUMENTS

| | | |
|---|---|---|
| 3,963,668 | 6/1976 | Wurmb et al. ........................ 524/593 |
| 4,230,606 | 10/1980 | Amann et al. ........................ 524/542 |
| 4,386,178 | 5/1983 | Schuette et al. ..................... 524/100 |
| 4,427,807 | 1/1984 | Zimmerman et al. .............. 524/542 |
| 4,578,422 | 3/1986 | Sakurai et al. ....................... 524/100 |

Primary Examiner—Lewis T. Jacobs
Attorney, Agent, or Firm—Burns, Doane, Swecker & Mathis

[57] ABSTRACT

Mechanical properties, especially tensile and flexural properties and impact strength, of glass fiber reinforced oxymethylene polymer molding compositions can be enhanced by incorporating into the molding compositions an effective amount of a prepolymeric amino resin, whereby the glass fiber reinforcing agent and the oxymethylene polymer are coupled. The amino resin can be a condensation product of formaldehyde and melamine, urea, guanidine, guanamine or a substituted guanamine. An acid catalyst is preferably employed to promote the cross-linking of the prepolymeric amino resin.

29 Claims, 1 Drawing Figure

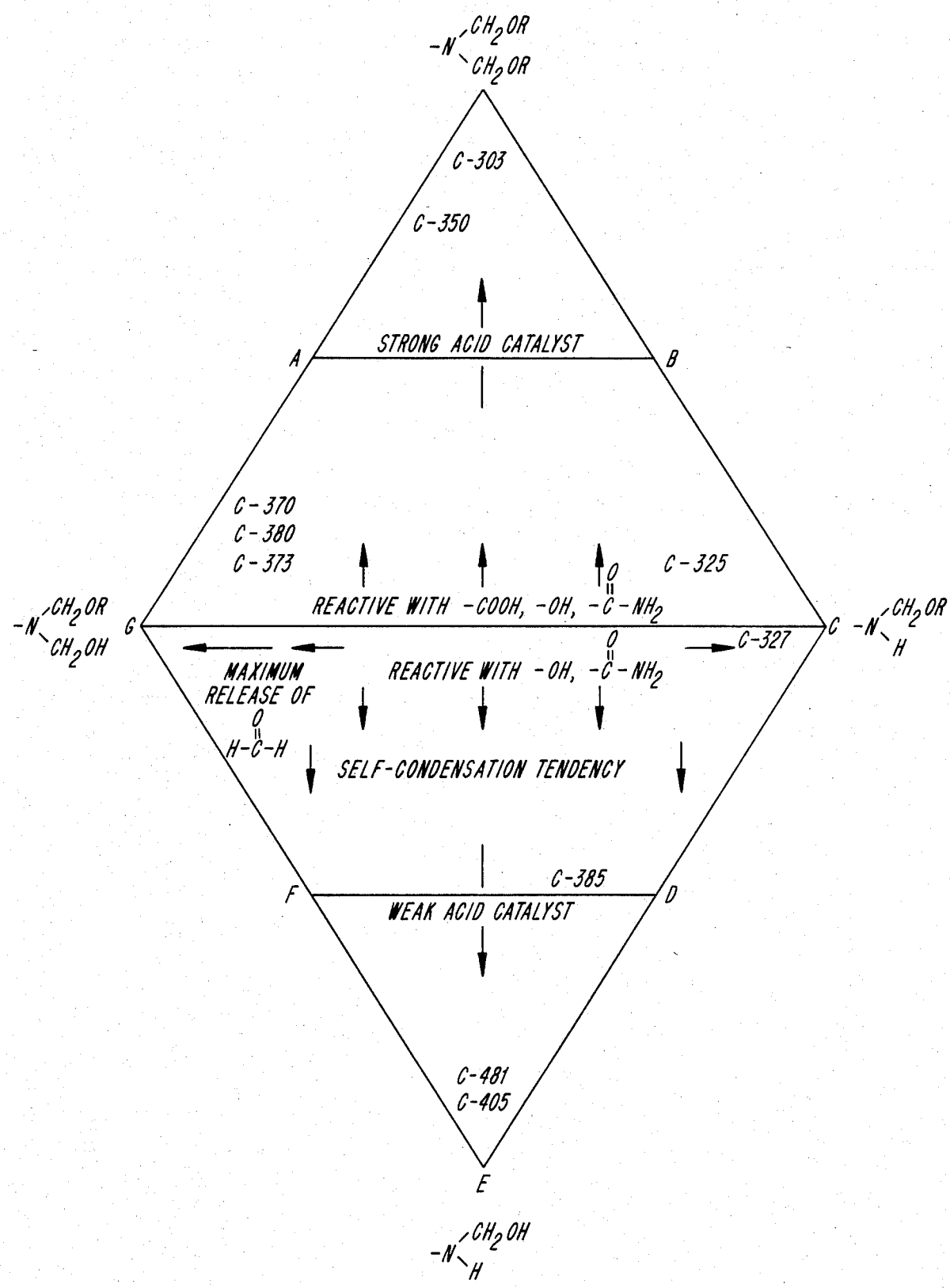

GLASS FIBER-REINFORCED OXYMETHYLENE POLYMER MOLDING COMPOSITIONS HAVING MECHANICAL PROPERTIES ENHANCED BY AMINO-FORMALDEHYDE RESIN COUPLING AGENTS

BACKGROUND OF THE INVENTION

The present invention relates to oxymethylene polymer molding compositions. More particularly, the present invention relates to glass-reinforced oxymethylene polymer molding compositions that contain a minor amount of a prepolymeric methylol amino resin, and which can be molded into articles having enhanced mechanical properties, particularly enhanced impact strength.

Oxymethylene polymers having recurring —CH$_2$O— units have been known for many years. They may be prepared by the polymerization of anhydrous formaldehyde or by the polymerization of trioxane, which is a cyclic trimer of formaldehyde.

The usefulness of oxymethylene polymers in molding compositions has also been known for years. For example, U.S. Pat. No. 3,275,604 discloses a moldable oxymethylene copolymer comprising oxymethylene groups and oxyethylene groups, with said oxyethylene groups having a —CH$_2$OR group pendant therefrom, which may be prepared by polymerizing a source of oxymethylene units such as trioxane with a glycidyl ether.

Various additives and improvements to oxymethylene molding compositions have been developed. For example, to permit molding objects of such compositions at relatively high temperatures without adversely affecting the surface characteristics of the molded objects, thermal stabilizers have been included in minor proportions. Compounds used as thermal stabilizers have included amine-substituted triazine monomers (U.S. Pat. No. 4,342,680), hydroxymethylol cyanoguanamine (U.S. Pat. No. 3,626,024), and cross-linked melamine-formaldehyde polycondensates (U.S. Pat. Nos. 4,139,575 and 4,230,606). U.S. Pat. No. 4,386,178 discloses polyacetal or oxymethylene polymer molding materials containing as a thermal stabilizer from 0.1 to 10 weight percent of a melamine resin described as a melamine-formaldehyde condensate having a mean degree of polymerization of from 1.2 to 6.0 and a melamine:formaldehyde ratio of from 1:2 to 1:5.5, which has been partially etherified with a C$_1$–C$_4$ alkanol so that the ratio of melamine:ether radicals is from 1:1.5 to 1:5.0 and the ratio of melamine:free methylol groups is from 1:0.5 to 1:3. The molding compositions can contain various conventional additives, including fillers of, e.g., glass fibers. The examples disclose increases in the melt index of the compositions containing the stabilizer, but no tests of mechanical properties of objects molded therefrom.

Numerous efforts have been made to improve the mechanical properties of objects molded from oxymethylene polymer molding compositions containing fibrous reinforcing agents such as glass fibers. For example, U.S. Pat. No. 3,963,668 discloses thermoplastic molding compositions of polyoxymethylenes containing 10–50 weight percent glass fibers and 0.1–5.0 weight percent of an alkoxymethyl urea, the inclusion of which is said to improve the tensile strength, flexural strength and impact resistance of molded objects. Conventional additives such as thermal stabilizers can be included. German Patent Specification DE-OS No. 2,921,167 discloses molding compositions of polyoxymethylenes containing 10–50 weight percent glass fibers and from 0.1 to 3 weight percent of an alkoxymethylmelamine monomer containing an average of at least two alkoxymethyl groups. This additive is said to improve the tensile, bending and impact strengths of objects molded from the resulting compositions, without discoloration in the molding process.

Despite the various efforts to improve the properties of reinforced oxymethylene polymer molding compositions, there is further room for improvement in these materials, particularly as to the mechanical properties of objects molded from thermally stabilized molding compositions.

Accordingly, it is an object of the present invention to provide an oxymethylene polymer molding composition that can be molded into objects which exhibit enhanced mechanical properties.

Another object of the present invention is to provide an improved glass fiber-reinforced oxymethylene polymer molding composition that can be molded into articles which exhibit enhanced mechanical properties such as tensile and flexural properties and impact strength.

Still another object of the present invention is to provide a glass fiber-reinforced oxymethylene polymer molding composition that is thermally stable at useful molding temperatures.

These and other objects, as well as the scope, nature and utilization of the present invention, will be apparent to those skilled in the art from the following description, the drawing, and appended claims.

SUMMARY OF THE INVENTION

In accordance with the present invention, an oxymethylene polymer molding composition which is capable of being molded to form objects exhibiting enhanced mechanical properties comprises an intimate blend of:

(a) a major portion of an oxymethylene polymer, (b) glass fibers in a reinforcing amount, (c) as a coupling agent for the glass fibers and oxymethylene polymer a minor but effective portion of at least one prepolymeric amino resin selected from condensation products of formaldehyde with at least one of guanidine, melamine, urea, guanamine or a substituted guanamine and having a degree of polymerization in the range of from about 2 to about 5, and (d) an amount of an acid catalyst effective to promote the cross-linking reactions of said amino resin.

In preferred embodiments, the prepolymeric amino resin can be a condensation product of formaldehyde and melamine.

Further in accordance with the present invention, a process is provided for molding an article having improved physical properties from a glass fiber-reinforced oxymethylene polymer molding composition comprising a major amount of an oxymethylene polymer, glass fibers in a reinforcing amount, and an amount of at least one prepolymeric amino resin selected from condensation products of formaldehyde with at least one of guanidine, melamine, urea, guanamine or a substituted guanamine and having a degree of polymerization of about 2 to about 5, the amount of amino resin provided being effective to couple the glass fiber and oxymethylene polymer.

BRIEF DESCRIPTION OF THE DRAWING

FIG. 1 is a plot of reactivity characteristics of various types of methylol melamine resins.

DESCRIPTION OF PREFERRED EMBODIMENTS

The present invention makes use of methylol amino prepolymer resins for chemically coupling the base polymer and the glass reinforcing agent in a glass fiber reinforced oxymethylene polymer molding composition during a thermal process such as injection molding or extrusion. Depending upon the degree of methylolation of the amino resin and the degree of alkylation of the resulting methylol groups, a suitable acid catalyst is generally useful in promoting the cross-linking reaction which accomplishes this coupling.

Any suitable form of glass fiber or roving reinforcing agent can be used for carrying out the invention, for example glass fibers chopped to ¼" lengths, which are commercially available under the following trade names and designations:

Owens-Corning-Ford, 408, 491, 497, P387;
PPG, 3540, 3541, 3090;
CertainTeed, 918A4, 930A4, 963A4.

The glass fibers can be pre-coated or sized with a sizing compound such as commercially available polymer-based sizing compounds.

Various suitable fillers known in the art can be used in addition to or in place of a portion of the glass reinforcing agent, including mineral fillers and organic filler such as carbon fibers and fibers of synthetic and natural polymers, e.g., cellulosic fibers. Preferred mineral fillers include silaceous fillers such as silica, glass beads, processed mineral fibers, mica, talc, kaolin, feldspar, wollastonite (a natural calcium silicate) and nephelines. Other useful mineral fillers include metals, metal oxides, calcium carbonate, asbestos and boron filaments.

OXYMETHYLENE POLYMER

The oxymethylene polymers useful in the molding compositions of the present invention are well known in the art. They are characterized as having recurring oxymethylene groups or units, i.e., $-CH_2O-$. The term oxymethylene polymer as used herein is intended to include any moldable, solid oxymethylene polymer having $-CH_2O-$ groups comprising at least about 50 percent of the recurring units, for example, homopolymers, copolymers, terpolymers and the like.

Typically, the homopolymers are prepared by the polymerization of anhydrous formaldehyde or by the polymerization of trioxane, which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in U.S. Pat. No. 2,989,506.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) $-OCH_2-$ groups interspersed with (b) groups represented by the general formula:

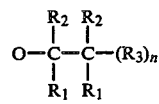

wherein each $R_1$ and $R_2$ is independently selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The $-OCH_2-$ units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like).

In general, the cyclic ethers employed in making the preferred oxymethylene copolymers are those represented by the general formula:

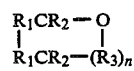

wherein each $R_1$ and $R_2$ is independently selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

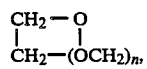

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably used in the molding compositions of the present invention are thermoplastic materials having a melting point of at least 150° C., and normally are millable or processable at a temperature of from about 180° C. to about 220° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer used is preferably one that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis, as disclosed in U.S. Pat. No. 3,219,623 to Berardinelli.

A preferred oxymethylene copolymer of ethylene oxide or dioxolane is melt hydrolyzed with triethylamine via an extruder or solution hydrolyzed in aqueous methanol with triethylamine.

If desired, the oxymethylene polymers may be end-capped by techniques known to those skilled in the art. A preferred. end-capping technique is accomplished by acetylation with acetic anhydride in the presence of sodium acetate catalyst.

A preferred oxymethylene copolymer is commercially available from Celanese Corporation under the Trademark "CELCON" acetal copolymer, and especially preferred is "CELCON" M90, which has a melt index of about 9.0 g./10 min. when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

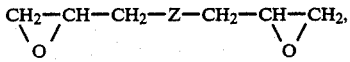

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formalehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer. The trioxane based terpolymer polymerization is advantageously carried out at temperatures at which trioxane does not crystallize out, that is, at a temperature within the range of −50° C. to +100° C., depending on the solvent used, and in the absence of a solvent at a temperature within the range of +20° C. to +100° C.

As trioxane-based terpolymer polymerization catalysts, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperatures within the range of 100° C. to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° C. to 250° C. for a specified period of time, and then washed with water and dried or centrifuged.

A preferred oxymethylene terpolymer is commercially available from Celanese Corporation under the Trademark "CELCON" U10, and is a butanediol diglycidyl ether/ethylene oxide/trioxane terpolymer containing about 0.05 weight percent, 2.0 weight percent, and 97.95 weight percent of each component, respectively.

METHYLOL AMINO RESINS

Various amino resins, defined as including either amino or amido groups, can be used in the present invention. The resins are prepared by condensing the amino or amido compound with formaldehyde to produce a prepolymer resin. Exemplary amino and amido compounds include guanidine, having the formula

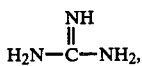

urea, having the formula

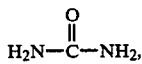

or a guanamine, chemically identified as 2,4-diamino-6-substituted 1,3,5-triazine, having the formula

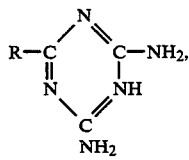

e.g., benzoguanamine, and melamine. The substituent R in the six position on the guanamine triazine ring is a hydrocarbon, or a halo- or nitro-substituted hydrocarbon group. The hydrocarbon may be a 1 to 22, preferably a 12 to 18 carbon atom, alkyl group; an aryl group such as phenyl; an aralkyl group such as benzyl; an alkaryl group such as tolyl or xylyl; or a cycloalkyl group of more than 3, and preferably from 6 to 10 carbon atoms such as cyclohexyl. Benzoguanamine, a commercially available substituted guanamine, is particularly useful in making amino resins for use in the practice of the invention. Other guanamines such as stearoguanamine may be used.

Since these amino compounds are all reactive with hydroxyl groups, they are all useful in the present invention. However, melamine-formaldehyde resins generally are more stable in response to heat and light effects under stress conditions than resins prepared from formaldehyde and urea or a guanamine.

Since melamine is the amino compound preferred at present for the preparation of the amino-formaldehyde prepolymeric resins for the practice of the invention, the following discussion will emphasize the use of melamines. However, any suitable amino or amido compound, or mixtures thereof, can be used in the preparation of the prepolymer resins which are useful in the present invention. For instance, mixtures of melamine and urea can be condensed with formaldehyde to produce an effective prepolymer resin. Similarly, the methylol amino resins can be used singly or in combination.

The melamine resins useful in the present invention are based on melamine, a cyclic trimer of cyanamide having the formula below:

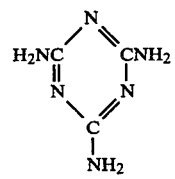

Formaldehyde can be added to any of the three amino groups in this molecule, forming as many as six methylol groups according to the equation $$XNH_2 + CH_2O \rightarrow XNCH_2OH,$$

where X represents the melamine moiety. Melamines can be prepared which can be described as ranging from partially to completely methylolated, depending upon the average number of methylol groups per molecule.

These methylol groups can be treated with alkyl alcohols under suitable conditions to alkylate or "cap" at least a portion of the methylol groups, forming ethers according to the equation

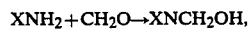

Various alcohols can be used, having from 1 to about 4 carbon atoms depending upon the alkyl groups it is desired to emplace and the resultant inhibition of reactivity, but methanol and n-butanol are presently preferred. Thus, a melamine which is partially or completely methylolated can further be at least partially alkylated, the degree of alkylation corresponding to the proportion of available methylol groups which are converted to ethers.

Melamines are converted into compounds which are useful as amino cross-linking agents by methylolation, and, optionally, alkylation. By carrying out the methylolation and alkylation reactions to varying degrees, melamine cross-linking agents can be produced which have the following varieties of reactive groups, numbered 1 through 5:

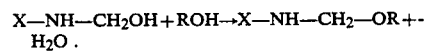

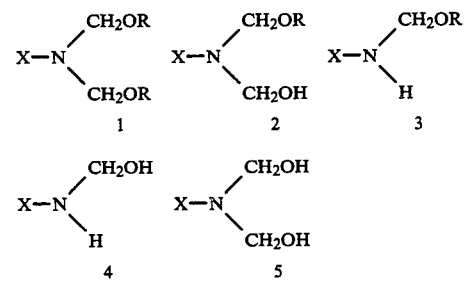

where X is the melamine moiety and R is a lower alkyl group having from 1 to about 4 carbon atoms, preferably methyl. These reactive groups can be described as (1) completely methylolated, completely alkylated; (2) completely methylolated, partially alkylated; (3) partially methylolated, completely alkylated; (4) partially methylolated, unalkylated; and (5) completely methylolated, unalkylated.

Most commercial amino resins used in surface coatings contain a variety of the above functional groups. Other groups may also be present, such as methylene or ether bridges. But in most instances, the reactivity or behavior of the amino resin will be determined mainly by one of the above groups. Various suitable methylol melamine resins are available commercially from the American Cyanamid Co. under the "CYMEL" trademark.

Such amino resins contain predominantly 1, 2, or 3 as functional groups. Group 4 is mainly present in laminating, textile, or adhesive resins. Cross-linking agents containing such resins can be catalyzed by various strong or weak acids, and display reactivity characteristics as shown in FIG. 1, which is discussed below.

Generally, it has been believed that the degree of alkylation and methylolation of an amino resin determines its reactivity and performance behavior in a coating. Actually, the distribution of various functional groups on each nitrogen atom on an amino resin is the main determining factor for its overall performance characteristics. For use in accordance with the present invention as a coupling agent additive to glass-filled oxymethylene polymer compositions, amino resins are preferred which provide a balance between reactivity, stabilizing ability and the processability of the resulting composition. The resins should be reactive enough to couple the glass reinforcing agent and the oxymethylene polymer (under extrusion conditions, but not before) without requiring the presence of a catalyst in excessive quantity or strength, but not so reactive as to react with itself in preference to the glass and oxymethylene polymer.

At present, the order of preference of such resins for use in the invention is for amino resins, preferably melamine-based, containing reactive groups 3, 2, 4, 1 and 5. Resins having reactive group 3, typified by "CYMEL" resins 325 and 327, have thus far been found to have the best overall balance of qualities, while those having reactive group 2, typified by "CYMEL" resins 370 and 380, are poorer stabilizers and less reactive. Resins containing reactive group 4, typified by "CYMEL" resin 481, are effective for use in the present invention, but tend to self-condense during processing, producing gels and lumps. Resins having reactive group 1, typified by "CYMEL" resin 301, are generally effective only with the use of strong acid catalysis, due to the complete alkylation of their methylol groups; however, the oxymethylene polymers tend to decompose in the presence of such acids. Resins containing reactive group 5 are generally considered unsuitable for use in the present invention, as the completely unalkylated methylol groups are too reactive, and the resins tend to self-condense during melt processing.

The prepolymeric amino resins suitable for use in the present invention include those which are at least partially methylolated, with at least a portion of the methylol groups being alkylated or capped with an alkyl group having from 1 to about 4 carbon atoms. Preferably, the amino resin is at least about 30 percent methylolated, with the proportion of the methylol groups thus alkylated being in the range of from about 30 to about 90 mole percent. In an embodiment, the amino resin is a melamine resin which is at least about 50 mole percent methylolated, at least about 80 mole percent of the methylol groups being alkylated. In another embodiment, a melamine resin can be used which is at least about 80 mole percent methylolated, with a proportion in the range of from about 70 to about 80 mole percent of the methylol groups being alkylated.

FIG. 1 shows the distribution of functional groups in various high solids amino cross-linking agents, the influence of this distribution of functional groups and the various performance trends.

The reactive groups or combination of reactive groups in such a high solids amino resin can be easily read from the diamond of FIG. 1. For example, "CYMEL" 303 resin is plotted between

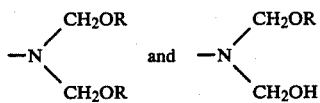

functional groups but very close to the

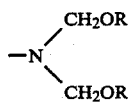

corner, therefore this resin is characterized as a highly alkylated melamine-formaldehyde resin with very low methylol content. "CYMEL" 385 resin, for example, is plotted between

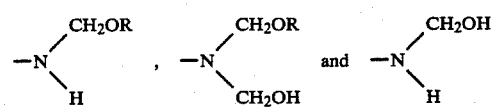

functionality. It, therefore, contains a combination of all three functional sites. Because it is positioned closer to

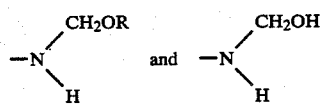

than to the

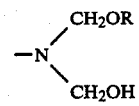

function ality, the former two functional groups dominate the performance characteristics.

Melamine resins having degrees of methylolation and alkylation preferred for use in the present invention are also indicated by the region lying substantially inside the line ABCDEFG of FIG. 1, representing resins which are not heavily methylolated and alkylated or "capped." A preferred group of resins excluding these highly methylolated and capped resins and the resins which are at least partially methylolated, but substantially unalkylated, lies within the region substantially defined by the line ABCDFG of FIG. 1.

FIG. 1 is a plot within which any methylolated melamine resin, whether unalkylated, partially or completely alkylated, can be plotted so that its reactivity characteristics can be estimated. Resins which plot near the top of the diagram require strong acid catalysts to achieve a desirably high reaction rate, while those resins plotting near the middle or bottom of the diagram give a satisfactory coupling reaction in the presence of a weak acid catalyst. Resins plotting near the left side tend to release more formaldehyde in coupling reactions, while resins plotting near the bottom of the diagram have a tendency to self-condense. Most of these resins are reactive with the hydroxyl and amide functional groups, but those plotting near the top of the diagram are more reactive with carboxylic acids.

The methylol melamine compounds discussed above are not resins per se, but these molecules can be condensed with the evolution of water to form resins. For the practice of the present invention, the methylol melamine compound or other methylol amino compound is condensed to form a prepolymer resin in which the degree of polymerization is at least about 2, and preferably in the range of from about 2 to about 5. In other words, on the average the molecules are condensed to form at least dimers, trimers or higher oligomers. Since condensation polymerization can easily be stopped and restarted, the desired degree of polymerization can be easily produced. For example, the method of preparation of the melamine polymers is well known and forms no part of the instant invention. Preparation of the polymers is described, for example, in *Encyclopedia of Polymer Science and Technology*, Volume 2, 1965, pages 17 to 21 and in *Industrial and Engineering Chemistry*, Volume 44, November 1952, pages 2679 to 2686. Briefly, they are prepared by reacting melamine with a formaldehyde solution, heating to form the polymer, adding a 1 to 4 carbon lower aliphatic alcohol and heating to alkylate the polymer. More than 3 but less than 6 moles of formaldehyde should be used for each mole of melamine, preferably 4 or 5 moles of formaldehyde per mole of melamine. The proper amount of the alcohol should then be added per mole of methylol groups to assure from 30 to 90 mole percent capping or alkylation as required, which is generally from about 1.5 to 5.0 moles of alcohol per mole of melamine.

The resulting prepolymer resins can be tested by any suitable means known to those skilled in the art to determine the degree of polymerization, such as gel permeation chromatography, liquid chromatography, and other separation-based techniques, and colligative property determination methods such as cryoscopy, ebulliometry, and membrane osmometry.

Generally, for a given methylol melamine compound, the prepolymer resins prepared therefrom have been found to be superior to the corresponding monomer compounds for the practice of the present invention, as they do not require the same degree of acid catalysis, have less embrittling effect, and provide compositions moldable into articles having superior tensile and impact properties.

Suitable methylol melamine resins can be prepared to meet the desired specifications, or selected from resins which are available commercially, such as, for example, those marketed under the "CYMEL" trademark by the American Cyanamid Co., Resins Department, Wayne, NJ 07470.

ACID CATALYSTS

The cross-linking reactions of most methylol amino resins useful in the present invention can be promoted or accelerated by the use of an acid catalyst. The acid catalyst should be chosen according to the reactivity characteristics of the resin. For example, it is known a strong acid catalyst is necessary to obtain the optimum reaction rate from highly alkylated methylol melamine resins with low NH group content, the reaction rate being relatively low at near-neutral conditions and increasing as pH decreases. On the other hand, the reactivity of partially alkylated methylol melamine resins, and highly alkylated resins with high NH group content, are less pH dependent, and their reaction rates level off as the pH of the system decreases.

For example, reaction rate studies in aqueous media, reported in the European Polymer Journal, Vol. 6, p. 98 (1970) show that at pH 5, the reaction rate of a hexamethyoxymethyl melamine is less than those of partially alkylated or high NH group containing methylol melamine resins. At about pH 2, these rates are approximately equal, and below pH 1, the fully alkylated resins have the faster reaction rate. Thus, a strong acid catalyst generally produces the best reaction rate in fully alkylated methylol melamine resins, while better results are obtained by using weak acid catalysts with other resins which are partially alkylated and/or have a high content of NH groups The prepolymeric amino resins useful in the present invention thus are preferably used in conjunction with an amount and type of acid catalyst effective to promote the cross-linking reactions of the amino resin. The amount of the acid catalyst required to produce optimum results will vary widely, depending upon the reactivity of the amino resins used and the type of catalyst, but an effective amount can easily be selected by persons skilled in the art. Generally the catalyst should be present in a concentration in the range of from about 0.0005 to about 0.1 weight percent of the molding composition. Alternatively, the catalyst can be present in an amount such that the weight ratio of catalyst to the amino resin is in the range of from about 0.001:1 to about 0.05:1.

For resins which are substantially completely methylolated and alkylated, strong mineral or organic acids such as hydrochloric, phosphoric or organic sulfonic acids, or Lewis acids such as $ZnCl_2$ or $MgCl_2$, may be required. However, since strong acids can be harmful to oxymethylene polymers, preferably amino resins are used which can be effectively promoted with weaker acids. These preferred acid catalysts can be selected from the group consisting of carboxylic acids having from 1 to about 20 carbon atoms, Lewis acids such as boron fluoride and its complex compounds, latent acids (i.e., compounds which form acids when heated, such as amine blocked acids) and weak inorganic acids such as boric and organic phosphate acids. Acid catalysts preferred at present because of availability and proven effectiveness include lactic, oxalic, formic and boric acids.

PREPARATION OF MOLDING COMPOSITIONS OF THE PRESENT INVENTION

The oxymethylene polymer molding compositions of the present invention comprise from about 5 to about 50 percent, preferably from about 10 to about 40 weight percent, and most preferably from about 20 to about 30 weight percent of the glass fiber reinforcing materials. Correspondingly, from about 50 to about 95 weight percent, preferably from about 60 to about 90 weight percent of the oxymethylene polymer is present, these proportions being based upon the total molding composition. The molding compositions further comprise a minor proportion of a methylol amino prepolymeric resin in an amount effective to couple the glass fiber and the oxymethylene polymer, but preferably not a significant excess. The amino resin is generally present in a quantity such that the weight ratio of the amino resin to the glass fibers is in the range of from about 0.01:1 to about 0.2:1, or an amount in the range of from about 0.05 to about 10 weight percent of the molding composition. Preferably, the weight ratio of amino resin to glass is in the range of from about 0.04:1 to about 0.1:1, corresponding to an amount in the range of from about 0.2 to about 5 weight percent. In a preferred embodiment, the amino resin and the glass are combined so as to at least partially coat the glass fibers with the resin before they are mixed with the oxymethylene polymer. A suitable type and quantity of acid catalyst, as described above, is preferably employed in an amount effective to promote the cross-linking reactions of the amino resin without adversely affecting the thermal stability of the oxymethylene polymer.

The molding compositions may suitably be prepared by any conventional procedure that will result in an intimate blend or mixture of the components. Preferably, dry or melt blending procedures and equipment are used. For example, the glass fibers, amino resin and acid catalyst can be dry mixed with the oxymethylene polymer (in the form of pellets, chips, granules or powder) typically at room temperature of from about 180° C., and preferably from about 185° C. to about 205° C.

Preferably, the oxymethylene polymer is dried before being subjected to the intimate blending procedure. The drying can be done in desiccated air having a dew point of about −30° C. to −40° C. or lower, at a temperature of from about 70° C. to about 110° C., and preferably above 80° C. The drying can also be accomplished in a vacuum oven, for example, at a temperature above about 90° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the oxymethylene polymer, preferably below about 0.05 weight percent, and most preferably below about 0.01 weight percent or lower.

The oxymethylene molding composition resulting from the intimate blending procedure is then comminuted mechanically, for example by chopping, pelletizing or grinding, into granules, pellets, chips, flakes or powders, and processed in the thermoplastic state, for example by injection molding or extrusion molding, into shaped articles, for example, bars, rods, plates, sheets, films, ribbons, tubes and the like.

Preferably, the comminuted oxymethylene molding composition is dried (as discussed above) prior to being molded.

In an embodiment, the amino resins useful in the present invention can be incorporated in a concentrate composition or master batch suitable for adding said resins to glass-filled oxymethylene molding compositions. Since most extruding and molding machinery will accommodate only solid materials, the liquid resins are mixed with the oxymethylene polymer flake in quantities which produce dry mixtures, or can be combined in various quantities to form melts which are extruded and pelletized for direct use in extruders. The concentrate composition comprises the oxymethylene polymer and an amount in the range of from about 10 to about 40 weight percent of the amino resin, preferably an amount greater than 10 weight percent, and most preferably from about 15 to about 30 weight percent. In a preferred embodiment, the concentrate comprises an oxymethylene polymer and about 15 to about 40 weight percent of a prepolymeric melamine formaldehyde resin having a degree of polymerization in the range of from about 2 to about 5, which is at least about 30 mole percent methylolated and has from about 30 to about 90 mole percent of the methylol groups alkylated with an alkyl group having from 1 to about 4 carbon atoms. A suitable acid catalyst can be included in the concentrates in the desired proportion to the amino resin used. Such amino resin concentrate compositions can be used conveniently in processes for molding articles of improved physical properties from glass fiber-reinforced oxymethylene polymer compositions, facilitating the addition of the proper amount of amino resin effective to couple the glass fiber and oxymethylene polymer.

It is within the ambit of the present invention that the oxymethylene polymer molding composition also include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties of the resulting molding composition and the articles molded therefrom. The additional additives can be admixed at any convenient stage in the molding composition preparation, but usually are added when the oxymethylene polymer is being blended or admixed with the glass fibers.

Suitable formaldehyde scavengers which may be used in minor amounts include monomeric cyanoguanidine, melamines, amine-substituted triazine, other amidines, ureas, hydroxyl salts of calcium, magnesium, and the like, salts of carboxylic acids, and metal oxides and hydroxides. Caution should be taken not to use such basic substances in quantities sufficient to materially deplete the acid catalyst in use and retard the reaction rate.

Suitable mold lubricants include alkylene bis stearamide, long-chain amines, waxes, oils, and polyether glycides. The preferred mold lubricant is commercially available from Glyco Chemical, Inc. under the designation Acrawax C and is alkylene bis stearamide.

The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

An oxymethylene terpolymer such as commercially available from Celanese Corporation under the Trademark "CELCON" U10 may also be added in minor quantities to the molding composition as a nucleant, preferably stablized by small amounts of Irganox 259 and calcium hydroxy stearate or cyanoguanidine.

Objects molded from the glass-reinforced oxymethylene molding compositions of the present invention exhibit enhanced tensile and impact properties, as indicated in the examples. Because of these properties, such oxymethylene molding compositions can be used to form molded objects of greater strength and toughness without added weight, or alternatively lighter objects of acceptable strength and toughness. The melamine resins used generally have good long term color heat stability and have the ability to stabilize oxymethylene polymer compositions.

The following Examples are given as specific illustrations of the claimed invention. It should be understood, however, that the specific details set forth in the examples are merely illustrative and in no wise limitative. All parts and percentages in the Examples and the remainder of the specification are by weight of the total molding composition unless otherwise specified.

EXAMPLE I

The oxymethylene polymer used in this and the following examples was a trioxane-ethylene oxide copolymer containing about 98 weight percent of recurring $-OCH_2-$ groups and about 2 weight percent of comonomer units derived from ethylene oxide having the formula $-OCH_2CH_2-$. The oxymethylene copolymer is prepared as previously has been described herein and more specifically in the aforementioned U.S. Pat. No. 3,027,352 to Walling et al, and had been hydrolyzed to stabilize the ends of the polymer chains. The oxymethylene copolymer possessed a crystallinity of approximately 75 percent, an inherent viscosity (I.V.) of approximately 1.3 (measured at 60° C. in a 0.1 weight percent solution in p-chlorophenol containing 2 weight percent of alphapinene), a melting temperature of 160° C., and a melt index of approximately 9.0 g./10 min. when tested in accordance with ASTM method D1238-82. This copolymer was used as a molding composition containing as stabilizers approximately 0.5 weight percent "Irganox" 259, 0.1 weight percent cyanoguanidine, 0.2 weight percent "Acrawax C" and 0.25 weight percent of "CELCON" U10 oxymethylene terpolymer.

These tests employed three different methylol melamines, one containing an almost fully alkylated and methylolated structure ("CYMEL" 301), while the other two resins contained a partially methylolated but completely alkylated variant ("CYMEL" 325 and 327). "CYMEL" 325 has a degree of polymerization of approximately 2.3 versus 1.8 for "CYMEL" 327. These resins were used with and without the presence of lactic acid as an acid catalyst. The acid catalyst was added at low levels, e.g., 0.001 or 0.01 weight percent of the molding composition, to minimize any degradation with the oxymethylene polymer matrix. In addition to compositions filled with glass, glass/ Wollastokup G (conventionally-sized)-oxymethylene methylene polymer compositions were examined. Glass fibers or chopped strands having an average length of about 1.4", and an average diameter of between about 0.00035 and 0.00050 inch were used. The chopped strands are fiberglass strands coated with various sizings known in the art, then chopped into lengths ranging from about ⅛ to ½ inch. The surface treatments vary for specific resin matrix systems, and provide the strand integrity levels required for free flow and ease of mixing and compounding.

Formulation and Test Procedures

A master batch of each methylol melamine resin with solution hydrolyzed oxymethylene polymer flake (1:2) was made by dry blending in a Henschel blender to assure uniform mixing and dispersion of the material in the final composition. The Henschel blender was charged with polymer flake and the methylol melamine resin (in solution) and intensively mixed at high speeds until the bed temperature reached 30° C. (about 1 minute). The resulting concentrate (3% of blend or 1% of actual melamine resin) was added to a composition of oxymethylene polymer and glass (25%) with and without acid catalyst (0.01%). The resulting mixture was tumble blended for 5 turns of the mixer. In some instances a mineral filler was added (15% glass and 10% Wollastokup G) in place of some of the glass component.

This material was rear fed into a 1½" Johnson extruder which was used to compound the materials at a rate of 50 lbs/hr. The barrel temperature was 380°-390° F., the die temperature was 380°-390° F., and the extruder was vented with vacuum (25" Hg). The resulting pellets were dried and then molded into standard ASTM parts for physical testing. A 6 oz. Cincinnati Milacron injection molding machine was used under standard glass-filled oxymethylene polymer processing conditions to obtain the parts. All parts were molded under two temperature conditions (380° F. and 420° F.), so that some insight could be obtained as to the optimal processing temperature and to demonstrate the effect of processing temperature versus resin reactivity and catalysis. In some instances black specks and discoloration were obtained at the higher molding temperature. In addition, 4 inch by 1/16 inch disks were molded for warpage measurements. The resulting parts were subjected to standard ASTM tests. In addition, warpage and shrinkage measurements were performed. The shrinkage measurements were performed by determining the dimensions (length/width) of a flex bar with accurate (±0.002) calipers and comparing it to the mold dimensions. The discs were measured for flatness using the Ono Sokki Digital Linear Gauge. Measurements were taken in the flow and transverse direction on the discs. A hand held micrometer was then used to measure the thickness of the disc at several points. The thickness measurement was subtracted from the flatness measurement to yield a warpage measurement. Measurements in the flow and transverse direction were reported.

The initial compositions tested contained a methylolated unalkylated melamine resin ("CYMEL" 481) with a degree of polymerization of about 1.4–1.6 having a combination of imino and methylol groups as reactive groups, and catalyzed with boric acid; and a half-methylolated, completely alkylated melamine resin ("CYMEL" 327) with a degree of polymerization of about 1.8, having only imino groups as the reactive groups, catalyzed with boric, lactic or oxalic acids. The physical properties of test parts molded with these compositions are presented in TABLE I. The control composition contained the same oxymethylene copolymer and 25 weight percent glass fiber reinforcement as the test compositions, with a phenoxy compound, a 2,2' bis (4-hydroxyphenyl)-epichlorohydrin product containing minimal amounts of terminal epoxy groups and having an average molecular weight of about 15,000 to 75,000 (available commercially from Union Carbide as PKHH), in place of the melamine resin, and no catalyst, as is customary with such a coupling agent. Test articles were molded at temperatures of 380° F.

TABLE I

GLASS-REINFORCED OXYMETHYLENE COPOLYMER WITH
MELAMINE-FORMALDEHYDE (M-F) COUPLING AGENTS

| COMPOSITION | M-F LEVEL (Wt. %) | ACID CATALYST[c] LEVEL (Wt. %) | TENSILE STRENGTH (psi) | TENSILE ELONGATION (percent) | FLEXURAL STRENGTH (psi) | FLEXURAL MODULUS (psi) $\times 10^{-6}$ |
|---|---|---|---|---|---|---|
| 1 | 0.7[a] | 0.01[c] | 15,780 | 3.15 | 24,890 | 1.053 |
| 2 | 1.5 | 0.01 | 16,800 | 4.84 | 26,676 | 1.011 |
| 3 | 2.0 | 0.01 | 16,980 | 4.24 | 27,744 | 1.065 |
| 4 | 0.7 | 0.001 | 15,240 | 4.24 | 23,994 | 1.066 |
| 5 | 1.5 | 0.001 | 16,860 | 4.24 | 27,731 | 1.055 |
| 6 | 2.0 | 0.001 | 16,980 | 4.84 | 27,688 | 1.068 |
| 7 | 0.5[b] | 0.01 | 16,480 | 4.24 | 26,324 | 1.040 |
| 8 | 1.5 | 0.01 | 17,020 | 4.84 | 27,668 | 1.065 |
| 9 | 0.5 | 0.001 | 16,560 | 4.24 | 26,583 | 1.033 |
| 10 | 1.5 | 0.001 | 16,960 | 4.84 | 26,999 | 1.029 |
| 11 | 0.5 | 0.01 | 15,340 | 3.63 | 24,479 | 1.024 |
| 12 | 1.5 | 0.01 | 16,780 | 4.84 | 26,650 | 1.024 |
| 13 | 0.5 | 0.001 | 15,960 | 4.24 | 25,178 | 1.034 |
| 14 | 1.5 | 0.001 | 16,820 | 4.84 | 27,541 | 1.027 |
| Control[d] | — | — | 11,005 | 1.31 | 16,583 | 1.007 |

NOTES:
[a]Compositions 1 through 6 contain "CYMEL" 481 melamine-formaldehyde resin, a substantially methylolated but unalkylated resin with a degree of polymerization of 1.4–1.6.
[b]Compositions 7 through 14 contain "CYMEL" 327 melamine-formaldehyde resin, a partially methylolated, fully methylated resin with a degree of polymerization of 1.8.
[c]Compositions 1 through 6 were catalyzed with boric acid. Compositions 7 through 10 were catalyzed with lactic acid and compositions 11 through 14 with oxalic acid.
[d]The control is an oxymethylene copolymer formulation (i.e., 0.2% phenoxy, 25% glass), using Union Carbide PKHH as the phenoxy compound.

The data for Compositions 1–6 in TABLE I indicate that the use of a melamine resin ("CYMEL" 481, methylolated but unalkylated), catalyzed with boric acid, as a coupling agent produces molded test parts with significantly higher tensile strength and elongation, and higher flexural strength than the control in which a phenoxy compound was used. Even flexural modulus is slightly but consistently higher. In Compositions 1–6, these values increase in magnitude with the amount of melamine resin (0.7–2.0%), with the particular concentration of boric acid catalyst used (0.01 or 0.001%) being relatively insignificant. The maximum increases are substantial, approximating 50 percent in tensile and flexural strength, and 200 percent in tensile elongation. Compositions 7–10 display similar results, using a partially methylolated, fully methylated resin ("CYMEL" 327) catalyzed by lactic acid, with the best results obtained with Composition 8 (containing 1.5% resin and 0.01% lactic acid). Larger amounts of resin could be expected to produce even higher values, within limits. Good results were also obtained with Compositions 11–14, using "CYMEL" 327 catalyzed with oxalic acid. Smaller quantities of the oxalic acid catalyst were required to produce peak values, compared with the compositions containing lactic acid.

EXAMPLE II

Further tests were run with compositions containing the oxymethylene copolymer, 25 percent glass, and varying amounts of the half-methylolated, completely methylated melamine resin ("CYMEL" 327, degree of polymerization 1.8), catalyzed by lactic acid. The physical properties of samples prepared of these compositions are shown in TABLE II.

TABLE II

GLASS REINFORCED OXYMETHYLENE COPOLYMER WITH MELAMINE FORMALDEHYDE COUPLING AGENT AND ACID CATALYST

| Composition ID | M-F Level (Wt. %) | Lactic Acid Level (Wt. %) | Tensile Strength (psi) | Tensile Elongation (%) | Flexural Strength (psi) | Flexural Modulus (psi $\times 10^{-6}$) |
|---|---|---|---|---|---|---|
| Control | — | — | 13,261 | 2.47 | 21,867 | 1.012 |
| 16 | 0.5 | 0.01 | 14,641 | 3.12 | 24,184 | 1.016 |
| 17 | 1.0 | 0.01 | 16,827 | 4.27 | 26,824 | 1.029 |
| 18 | 2.0 | 0.01 | 17,214 | 4.91 | 27,921 | 1.042 |
| 19 | 0.5 | 0.001 | 14,591 | 2.94 | 23,651 | 1.027 |
| 20 | 1.0 | 0.001 | 15,763 | 3.17 | 25,349 | 1.013 |
| 21 | 2.0 | 0.001 | 16,221 | 4.69 | 26,236 | 1.019 |
| 22 | 1.0 | — | 13,399 | 2.91 | 24,783 | 1.061 |

Comparing compositions 16 and 22 with the control, it can be seen that substantial increases in tensile and flexural strength as well as elongation are obtained by adding 0.5 to 2.0 weight percent of the melamine resin with catalyst (0.001 to 0.01 weight percent). The use of the catalyst does enhance the effects obtained with the resin alone, as can be seen by comparing Compositions 17 and 20 with Composition 22, and a significantly better effect is obtained at the higher catalyst levels (Compositions 16–18) than at the comparable compositions (19–21) with lower catalyst levels. The highest values of these physical parameters were obtained by using 2 weight percent of the resin. Physical properties for the control of Table II were higher than corresponding values of the control of Table I, apparently because the larger, commercial size injection molding machine used for the compositions of Table II provided a higher injection molding pressure.

EXAMPLE III

Additional tests were conducted using the compositions shown in Table III.

Test pieces molded of the compositions of TABLE III were tested for various physical properties, with the results shown in TABLE IV, parts 1 and 2.

TABLE IV-1

GLASS/MINERAL OXYMETHYLENE POLYMER COMPOSITIONS CONTAINING MELAMINE-FORMALDEHYDE (M-F) COUPLING AGENTS WITH OR WITHOUT ACID CATALYSIS

|    | Tensile Strength psi break | Elongation percent | Tensile Modulus psi $\times 10^5$ | Flexural Strength psi | Flexural Modulus psi $\times 10^5$ | Notched Izod ft-lb/in | Tensile Impact ft-lb/in$^2$ | Gardner Impact in-lbs |
|----|---|---|---|---|---|---|---|---|
| 1A | 16,251 | 2.73 | 14.0 | 24,350 | 10.0 | 1.25 | 58.21 | 1–2.5 |
| B  | 17,313 | 3.09 | 11.8 | 26,346 | 10.24 | 1.50 | 95.3 | 2.5–5.0 |
| 2A | 16,794 | 2.58 | 15.1 | 25,515 | 10.9 | 1.24 | 51.48 | 1–2.5 |
| B  | 18,426 | 3.07 | 12.3 | 27,441 | 10.9 | 1.69 | 106.6 | 2.5–5.0 |
| 3A | 13,083 | 1.66 | 15.2 | 19,210 | 10.5 | .925 | 26.4 | 1–2.5 |
| B  | 14,873 | 2.14 | 12.8 | 23,000 | 10.5 | 1.086 | 46.4 | 1–2.5 |
| 4A | 15,988 | 2.42 | 15.3 | 24,950 | 10.8 | 1.11 | 50.64 | 1–2.5 |
| B  | 18,244 | 3.06 | 12.1 | 27,660 | 10.8 | 1.67 | 96.4 | 2.5–5.0 |
| 5A | 15,100 | 2.32 | 15.5 | 23,022 | 10.3 | .975 | 45.0 | 1–2.5 |
| B  | 17,525 | 2.95 | 11.8 | 26,325 | 10.9 | 1.451 | 80.48 | 1–2.5 |
| 6A | 12,541 | 1.66 | 15.3 | 19,310 | 10.05 | .794 | 26.48 | 1–2.5 |
| B  | 15,080 | 2.21 | 11.6 | 22,644 | 10.41 | 1.055 | 46.5 | 1–2.5 |
| 7A | 12,000 | 2.70 | 11.6 | 19,462 | 8.56 | .706 | 38.32 | 1–2.5 |
| B  | 13,077 | 3.12 | 9.47 | 20,663 | 8.63 | 1.10 | 50.55 | 2.5–5.0 |
| 8A* | 11,418 | 2.51 | 11.1 | 17,827 | 8.18 | .660 | 31.3 | 1–2.5 |
| B* | 12,191 | 2.80 | 8.93 | 19,099 | 8.11 | .781 | 43.2 | 1–2.5 |
| 9A* | 13,837 | 1.92 | 14.8 | 20,795 | 10.3 | .965 | 36.85 | 1–2.5 |
| B* | 15,982 | 2.36 | 12.3 | 23,211 | 10.3 | 1.286 | 67.82 | 2.5–5.0 |

A = Molded at 380° F.
B = Molded at 420° F.
*Controls

TABLE III

OXYMETHYLENE POLYMER COMPOSITIONS FOR TESTS

| Composition[a] | Glass[b] | Mineral[c] | Resin Coupler | Resin[d] Type | Lactic Acid | Polymer |
|---|---|---|---|---|---|---|
| 1 | 25 |    | 1.0 | "CYMEL" 325 | .01 | 73.99 |
| 2 | 25 |    | 1.0 | "CYMEL" 327 | .01 | 73.99 |
| 3 | 25 |    | 1.0 | "CYMEL" 301 | .01 | 73.99 |
| 4 | 25 |    | 1.0 | "CYMEL" 325 |     | 74 |
| 5 | 25 |    | 1.0 | "CYMEL" 327 |     | 74 |
| 6 | 25 |    | 1.0 | "CYMEL" 301 |     | 74 |
| 7 | 15 | 10 | 1.0 | "CYMEL" 325 | .01 | 73.99 |
| 8 (Control) | 15 | 10 | 0.20 | Phenoxy PKHH[e] |     | 74.8 |
| 9 (Control) | 25 |    | 0.20 | Phenoxy PKHH[e] |     | 74.8 |

[a]All proportions in weight percent of total composition.
[b]Glass fiber reinforcement, ¼ inch chopped glass strands with polymeric sizing.
[c]Mineral filler, Wollastakup G, a Wollastonite (CaSiO$_3$, a natural calcium silicate found in metamorphic rocks) containing a conventional sizing.
[d]"CYMEL" 325 - a partially methylolated and methylated melamine resin with degree of polymerization of about 2.3.
"CYMEL" 327 - a resin similar to "CYMEL" 325, with degree of polymerization of about 1.8.
"CYMEL" 301 - a completely methylolated, partially methylated melamine resin with degree of polymerization of about 1.5.
[e]The earlier-described polyhydroxy ether available commercially from Union Carbide.

TABLE IV-2

GLASS/MINERAL OXYMETHYLENE POLYMER COMPOSITIONS CONTAINING MELAMINE-FORMALDEHYDE (M-F) COUPLING AGENTS WITH ACID CATALYSIS

|    | HDT[a] 26 psi, °C. | Hunter Color | | | Shrinkage | | Warpage | | CH$_2$O |
|----|---|---|---|---|---|---|---|---|---|
|    |    | L | A | B | Length (%) | Width (%) | Flow | Transverse |    |
| 1A | 161 | 76.0 | −1.86 | 6.6 | .304 | .76 | .095 | .20 | .036 |
| 1B | 161 | 75.6 | −2.9 | 9.44 | .32 | .88 |     |     |     |
| 2A | 161 | 73.7 | −1.4 | 5.94 | .284 | .76 | .099 | .215 | .056 |
| 2B | 162 | 75.1 | −3.1 | 9.81 | .284 | .80 |     |     |     |
| 3A | 161 | 72.3 | −1.7 | 6.65 | .252 | .80 | .099 | .216 | .038 |
| 3B | 161 | 75.3 | −3.1 | 10.6 | .284 | .88 |     |     |     |
| 4A | 161 | 73.1 | −1.9 | 7.23 | .288 | .80 | .102 | .228 | .041 |
| 4B | 162 | 76.2 | −3.1 | 10.26 | .324 | .96 |     |     |     |
| 5A | 161 | 76.3 | −2.6 | 7.4 | .324 | .88 | .106 | .228 | .035 |
| 5B | 161 | 73.85 | −2.9 | 8.86 | .28 | .72 |     |     |     |
| 6A | 160 | 74.3 | −2.26 | 7.93 | .336 | 1.12 | .106 | .230 | .027 |
| 6B | 161 | 74.8 | −2.74 | 11.10 | .348 | 1.20 |     |     |     |

TABLE IV-2-continued

GLASS/MINERAL OXYMETHYLENE POLYMER COMPOSITIONS
CONTAINING MELAMINE-FORMALDEHYDE (M-F)
COUPLING AGENTS WITH ACID CATALYSIS

| | HDT[a] 26 psi, °C. | Hunter Color | | | Shrinkage | | Warpage | | |
|---|---|---|---|---|---|---|---|---|---|
| | | L | A | B | Length (%) | Width (%) | Flow | Transverse | $CH_2O$ |
| 7A | 158 | 73.5 | −1.86 | 6.5 | .54 | .76 | .074 | .144 | .035 |
| 7B | 160 | 75.3 | −2.5 | 8.2 | .50 | .76 | | | |
| 8A* | 156 | 69.9 | −1.92 | 6.32 | .592 | .84 | .080 | .165 | .052 |
| 8B* | 159 | 71.5 | −2.2 | 8.10 | .588 | .80 | | | |
| 9A* | 160 | 72.9 | −2.1 | 7.28 | .36 | 1.00 | .10 | .215 | .041 |

A = Molded at 380° F.
B = Molded at 420° F.
*Controls
[a]HDT = Heat Deflection Temperature As shown in TABLE IV, the oxymethylene polymer compositions were evaluated by measuring physical properties of samples molded at two molding temperatures. It can be seen that at either 380° or 420° F., improvements were obtained with the use of the melamine resins as compared to the phenoxy-coupled controls if either "CYMEL" 327 or "CYMEL" 325 were used. However, it is readily apparent from the data that an increase in the overall level of the tensile and flexural strength, and impact properties (notched Izod, tensile and Gardner impact values) was obtained by molding at elevated temperatures (420° F.) versus the lower (380° F.). These improvements were obtained at the expense of an increase in Hunter B values with some concomitant increase in black speck count, and a slight reduction in tensile modulus. These data suggest that some form of chemical reaction has taken place which is sensitive to the degree of thermal activation. The phenoxy-coupled control samples were also shifted upwards to higher levels of tensile strength (i.e., 16,000 psi). Molding temperatures above about 400° F. have been used with such phenoxy-coupled glass-filled oxymethylene polymer compositions, to facilitate any interfacial coupling reactions between the oxymethylene and glass components. Significantly, tensile values of up to 18,426 psi and a notched Izod value of 1.67 ft/lbs/in were obtained with the melamine resins, which was 2400 psi higher in tensile strength and 0.3 ft/lbs higher in notched Izod value than the phenoxy-coupled controls. The "CYMEL" 325 prepolymeric resin (D.P.=2.3) achieved these values in the uncatalyzed state, while "CYMEL" 327 (D.P.=1.8) had to be acid-catalyzed to achieve this level of improvement. On the other hand, "CYMEL" 301 did not yield similar improvements under the test conditions used. This is expected on the basis of the chemical structure of the coupling resins, since fully methylolated, alkylated resins generally require strong acid catalysis to function.

At the lower molding temperatures, differences in properties obtained between the catalyzed and noncatalyzed runs were also readily apparent, with acid catalysis yielding approximately 200–1700 psi units improvement to the tensile strength at yield values. Acid catalysis generally led to an undesirable increase in formaldehyde levels, however, which is indicative of the destabilizing nature of such additives in oxymethylene polymer compositions.

Very significantly, it is the prepolymeric "CYMEL" 325 (DP=2.3) which achieved similar improved property levels at 380° F. molding temperature, with and without acid catalysis, as compared to the monomeric (DP=1.8) control, "CYMEL" 327. Objects molded of the compositions containing "CYMEL" 325 uncatalyzed also exhibited better properties (tensile, flexural strength, impact) than those with "CYMEL" 327 uncatalyzed at elevated molding conditions (420° F.). This could be related to the improved ability of a larger coupling chain (i.e., "CYMEL" 325) to find the glass and oxymethylene reactive sites in a medium of relatively low chain mobility (a viscous melt). This is a key difference from prior art work (DE-OS No. 2,921,167), where a monomeric methylol melamine was used without the presence of a catalyst for improving glass-filled polyoxymethylene tensile properties.

At higher molding temperatures (420° F.) the differences between the uncatalyzed and the catalyzed results tended not to be so great, especially for "CYMEL" 327. This may be related to the levelling effect of thermal activation in increasing the rate of reaction separate from catalyst addition.

A similar trend was found for glass/mineral-filled oxymethylene polymers. Improvements in tensile and impact properties were noted for the melamine resin formulations versus the phenoxy-coupled controls.

Shrinkage, warpage and thermal properties appeared to be at similar levels between the melamine resin samples and the phenoxy-coupled samples for all formulations studied.

Although the invention has been described with preferred embodiments, it is to be understood that variations and modifications can be employed without departing from the gist of the invention.

We claim:

1. A glass fiber-reinforced oxymethylene polymer molding composition comprising a blend of:
    (a) a major portion of an oxymethylene polymer,
    (b) glass fibers in a reinforcing amount,
    (c) as a coupling agent for said glass fibers and said oxymethylene polymer, a minor but effective amount of at least one prepolymeric amino resin selected from condensation products of formaldehyde with at least one of guanidine, melamine, urea, guanamine or a substituted guanamine and having a degree of polymerization in the range of from about 2 to about 5, and
    (d) an amount of an acid catalyst effective to promote the cross-linking reactions of said amino resin.

2. A molding composition in accordance with claim 1, wherein said oxymethylene polymer is selected from the group consisting of:
    (i) oxymethylene homopolymer,
    (ii) oxymethylene copolymer comprising about 85 to about 99.9 percent recurring $-OCH_2-$ groups interspersed with groups of the formula:

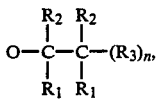

wherein each $R_1$ and $R_2$ is independently selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl and haloaltyl radical having from 1 to 2 carbon atoms, inclusive, said copolymer having a number average molecular weight of at least 10,000 and a melting point of at least 150° C., and (iii) oxymethylene terpolymer, which is the reaction product of trioxane, a cyclic ether and/or cyclic acetal, and a diglycide of the formula:

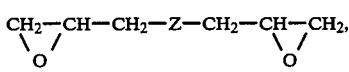

wherein Z is selected from the group consisting of a carbon-to-carbon bond, oxygen, an oxyalkoxy of 1 to 8 carbon atoms, and an oxypoly(lower alkoxy).

3. A molding composition in accordance with claim 1, wherein said glass fibers are present in a concentration in the range of from about 5 to about 50 weight percent of said molding composition.

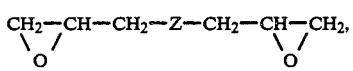

4. A molding composition in accordance with claim 1, wherein said glass fibers are present in a concentration in the range of from about 10 to about 40 weight percent of said molding composition.

5. A molding composition in accordance with claim 1, wherein said amino resin is a condensation product of formaldehyde and melamine.

6. A molding composition in accordance with claim 1, wherein said amino resin is a condensation product of formaldehyde with melamine and at least one of guanidine, urea, guanamine or a substituted guanamine.

7. A molding composition in accordance with claim 1, wherein said amino resin is at least partially methylolated, at least a portion of the methylol groups being alkylated with an alkyl group having from 1 to about 4 carbon atoms.

8. A molding composition in accordance with claim 7, wherein said amino resin is at least about 30 mole percent methylolated.

9. A molding composition in accordance with claim 8, wherein the proportion of the methylol groups thus alkylated is in the range of from about 30 to about 90 mole percent.

10. A molding composition in accordance with claim 7, wherein said amino resin is a melamine resin which is at least about 50 mole percent methylolated, at least about 80 mole percent of said methylol groups being thus alkylated.

11. A molding composition in accordance with claim 7, wherein said amino resin is a melamine resin which is at least about 80 mole percent methylolated, with a proportion in the range of from about 70 to about 80 mole percent of said methylol groups being thus alkylated.

12. A molding composition in accordance with claim 1, wherein said amino resin is present as an amount in the range of from about 0.05 to about 10 weight percent of said molding composition.

13. A molding composition in accordance with claim 1, wherein said amino resin is present as an amount in the range of from about 0.2 to about 5 weight percent of said molding composition.

14. A molding composition in accordance with claim 1, wherein said amino resin is present in a quantity such that the weight ratio of said amino resin to said glass fibers is in the range of from about 0.01:1 to about 0.2:1.

15. A molding composition in accordance with claim 1, wherein said amino resin is applied to said glass fibers before blending said fibers with said oxymethylene polymer.

16. A molding composition in accordance with claim 1, wherein said acid catalyst is present in a concentration in the range of from about 0.0005 to about 0.1 weight percent of said molding composition.

17. A molding composition in accordance with claim 1, wherein said acid catalyst is present in a quantity such that the weight ratio of said catalyst to said amino resin is in the range of from about 0.0001:1 to about 0.05:1.

18. A molding composition in accordance with claim 1, werein said acid catalyst is selected from the group consisting of carboxylic acids having from about 1 to about 20 carbon atoms, Lewis acids, latent acids and weak inorganic acids.

19. A molding composition in accordance with claim 1, wherein said acid catalyst is lactic acid, boric acid, oxalic acid or formic acid.

20. A molding composition in accordance with claim 1, wherein said amino resin is a melamine resin having degrees of methylolation and alkylation substantially indicated by the area within the line ABCDEFG of FIG. 1.

21. A molding composition in accordance with claim 1, wherein said amino resin is a melamine resin having degrees of methylolation and alkylation substantially indicated by the area within the line ABCDFG of FIG. 1.

22. A glass fiber-reinforced oxymethylene polymer molding composition comprising:
(a) a major portion of an oxymethylene polymer selected from the group consisting of:
  (i) oxymethylene homopolymer,
  (ii) oxymethylene copolymer comprising about 85 to about 99.9 percent recurring —$OCH_2$— groups interspersed with groups of the formula:

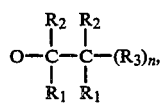

wherein each $R_1$ and $R_2$ is independently selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl and haloalkyl radical having from 1 to 2 carbon atoms, inclusive, said copolymer having a number average molecular weight of at least 10,000 and a melting point of at least 150° C., and (iii) oxymethylene terpolymer, which is the reaction product of trioxane, a cyclic ether and/or cyclic acetal, and a diglycide of the formula:

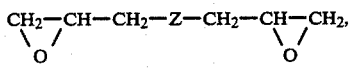

wherein Z is selected from the group consisting of a carbon-to-carbon bond, oxygen, an oxyalkoxy of 1 to 8 carbon atoms, and an oxypoly(-lower alkoxy), (b) glass fibers in a reinforcing amount, (c) as a coupling agent for said glass fibers and said oxymethylene polymer, a minor but effective amount of at least one prepolymeric melamine resin having a degree of polymerization in the range of from about 2 to about 5, wherein said melamine resin is at least partially methylolated and at least a portion of the methylol groups are alkylated with an alkyl group having from 1 to about 4 carbon atoms, and (d) a quantity of an acid catalyst effective to promote the cross-linking reactions of said melamine resin.

23. A molding composition in accordance with claim 22, wherein said melamine resin is at least about 50 mole percent methylolated, and a proportion in the range of from about 40 to about 90 mole percent of the methylol groups are thus alkylated.

24. A molding composition in accordance with claim 22, wherein the proportion of methylol groups thus alkylated is in the range of from about 80 to about 90 percent.

25. A molding composition in accordance with claim 22, wherein the weight ratio of said melamine resin to said glass fibers is in the range of from about 0.04:1 to about 0.1:1.

26. A glass fiber-reinforced oxymethylene polymer molding composition comprising a blend of:

(a) a major portion of an oxymethylene polymer, (b) glass fibers in a reinforcing amount, (c) as a coupling agent for said glass fibers and said oxymethylene polymer, a minor but effective amount of at least one prepolymeric melamine resin having a degree of polymerization in the range of from about 2 to about 5, said resin being at least about 50 mole percent methylolated and at least about 80 mole percent of the methylol groups being methylated, and (d) an amount of a weak carboxylic acid as a catalyst effective to promote the cross-linking reactions of said melamine resin.

27. A molding composition in accordance with claim 26, further comprising a mineral filler.

28. A glass fiber-reinforced oxymethylene polymer molding composition comprising a blend of:

(a) a major portion of an oxymethylene polymer, (b) glass fibers in a reinforcing amount, (c) as a coupling agent for said glass fibers and said oxymethylene polymer, a minor but effective amount of at least one prepolymeric melamine resin having a degree of polymerization in the range of from about 2 to about 5, said resin being at least about 50 mole percent methylolated, with the methylol groups being substantially uncapped, and (d) an amount of a weak inorganic acid as a catalyst effective to promote the cross-linking reactions of said melamine resin.

29. A glass fiber-reinforced oxymethylene polymer molding composition comprising an intimate blend of:

(a) a major portion of an oxymethylene polymer, (b) glass fibers in a reinforcing amount, (c) as a coupling agent for said glass fibers and said oxymethylene polymer, a minor but effective amount of at least one prepolymeric melamine resin having a degree of polymerization in the range of from about 2 to about 5, said resin being at least about 70 mole percent methylolated and at least about 80 mole percent of the methylol groups being methylated, and (d) an amount of a strong acid as a catalyst effective to promote the cross-linking reactions of said melamine resin.

* * * * *